(12) United States Patent
Iida

(10) Patent No.: US 6,835,008 B2
(45) Date of Patent: Dec. 28, 2004

(54) IMAGE SENSING APPARATUS HAVING A PROTECTION COVER

(75) Inventor: Seiji Iida, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/197,015

(22) Filed: Jul. 17, 2002

(65) Prior Publication Data

US 2002/0181957 A1 Dec. 5, 2002

Related U.S. Application Data

(63) Continuation of application No. 09/265,045, filed on Mar. 9, 1999, now Pat. No. 6,457,881.

(30) Foreign Application Priority Data

Mar. 9, 1998 (JP) ............................................ 10-056749

(51) Int. Cl.$^7$ ............................................... G03B 17/00
(52) U.S. Cl. .................................. 396/448; 348/207.11
(58) Field of Search ................................. 396/300, 448; 348/207.11, 373, 376, 552; 358/906, 909.1

(56) References Cited

U.S. PATENT DOCUMENTS

| | | | |
|---|---|---|---|
| 4,998,125 A | 3/1991 | Watanabe et al. | 354/403 |
| 5,604,551 A | 2/1997 | Choi et al. | 396/58 |
| 5,978,016 A | 11/1999 | Lourette et al. | 348/64 |
| 6,457,881 B1 * | 10/2002 | Iida | 396/448 |
| 6,545,775 B1 * | 4/2003 | Watanabe et al. | 358/442 |
| 2001/0012071 A1 * | 8/2001 | Oeda et al. | 348/333.01 |
| 2002/0024611 A1 * | 2/2002 | Watanabe et al. | 348/373 |

FOREIGN PATENT DOCUMENTS

| | | | |
|---|---|---|---|
| EP | 0754994 A2 | 1/1997 | |
| JP | A 5-122570 | 5/1993 | H04N/5/225 |
| JP | U 5-057971 | 7/1993 | H04N/5/225 |
| JP | A 6-217175 | 8/1994 | H04N/5/225 |
| JP | A 8-088785 | 4/1995 | H04N/5/225 |
| JP | A 9-037123 | 2/1997 | H04N/5/225 |
| JP | A 9-061921 | 3/1997 | H04N/5/225 |
| JP | A 9-135377 | 5/1997 | H04N/5/225 |

OTHER PUBLICATIONS

English Abstract for JPA 6–217175.
English Abstract for JPA 8–088785.
English Abstract for JPA 9–037123.
English Abstract for JPA 9–135377.
Partial English translation of JPU 5–057971.
English Abstract for JPA 5–122570.
English Abstract for JPA 9–061921.

* cited by examiner

Primary Examiner—David M. Gray
(74) Attorney, Agent, or Firm—Morgan & Finnegan, L.L.P.

(57) ABSTRACT

An image sensing apparatus such as digital still camera and video camera having a protection cover for protecting an image sensing optical system. The cover is openable and closable. The image sensing apparatus comprises a cover driver for driving the protection cover; and a control circuit which determines whether the apparatus is set in a image sensing mode, or in an external control mode in which the apparatus is controlled by an external controller unit. The circuit determines an operation of the cover driver in accordance with a determination result.

82 Claims, 15 Drawing Sheets

IMAGE SENSING APPARATUS HAVING A PROTECTION COVER

This is a continuation of application Ser. No. 09/265,045, filed Mar. 9, 1999, now U.S. Pat. No. 6,457,881.

BACKGROUND OF THE INVENTION

The present invention relates to an image sensing apparatus and a recording/reproduction apparatus having a protection cover such as an electronic still camera and a video camera.

Recently, there have been proposed a type of digital still cameras and video cameras having a lens-protection cover which is open to expose an objective lens during image-capturing and is closed to protect the lens during non image capturing. Such lens-protection cover is referred to as "barrier" hereinafter.

FIG. 1 is a perspective view showing a digital camera equipped with such barrier.

In FIG. 1, reference numeral 60 denotes an operation lever for opening and closing a barrier (not shown). A user operates this operation lever 60 to open the barrier connected thereto.

With the spread of personal computers, it has been desired to control a digital camera from a computer which connects the.

In the prior arts set forth above, an operation to open or close the barrier is made at the camera body side. The prior arts have not paid any attentions to how and when to open and close the barrier when the camera is controlled by the external computers

SUMMARY OF THE INVENTION

The present invention has been made in consideration of the aforementioned problem involved in the prior art.

An object of the present invention is to provide an image sensing apparatus having a protection cover, such as a digital still camera and video camera, that can be controlled depending on whether an external controller such as a PC and workstation is connected to the apparatus.

The above object is achieved by providing an image sensing apparatus comprising: a protection cover which is openable and closable, and protects an image sensing optical system; a cover driving device driving the protection cover; and a determination device determining whether the image sensing apparatus is set into a image sensing mode, or into an external control mode in which the apparatus is controlled by an external controller unit, wherein the determination device determines an operation of the cover driving device in accordance with a determination result.

According to the apparatus thus constructed, in a case where the image sensing apparatus is controlled by the external controller unit, opening and closing operations of the cover are suitably controlled.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

A preferred embodiment according to the present invention will be described in detail below with reference to the accompanying drawings.

Figure 1:
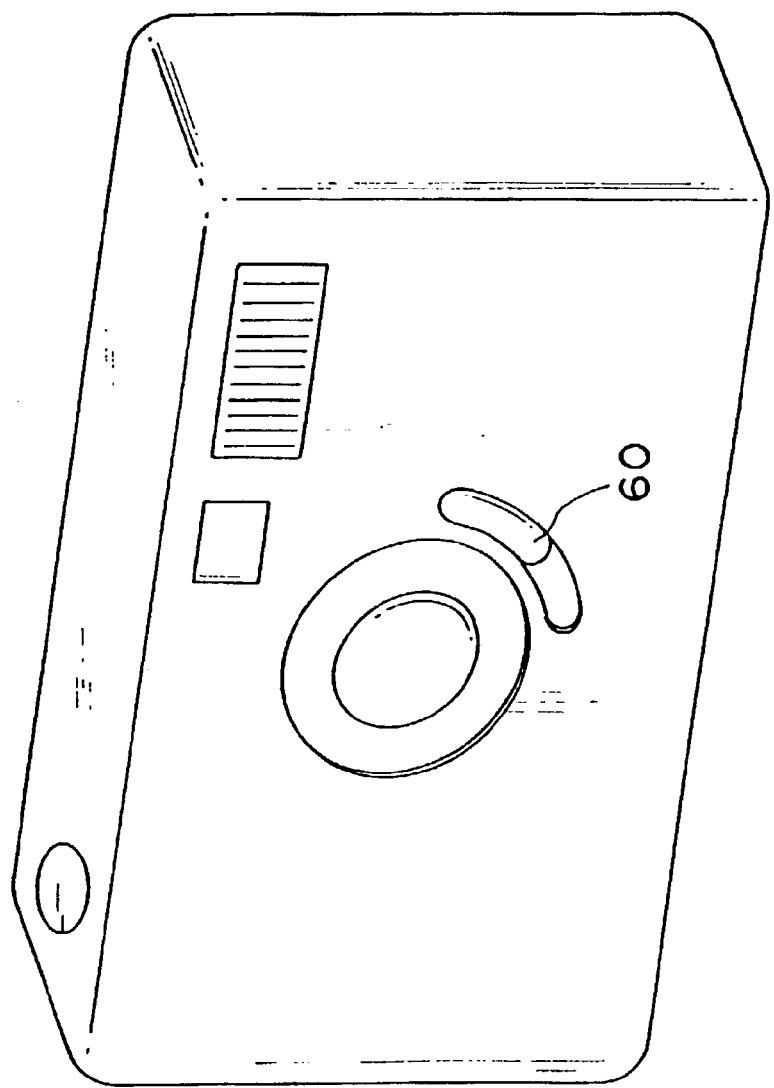
FIG. 1 is a perspective view showing a conventional digital camera.
Figure 2:
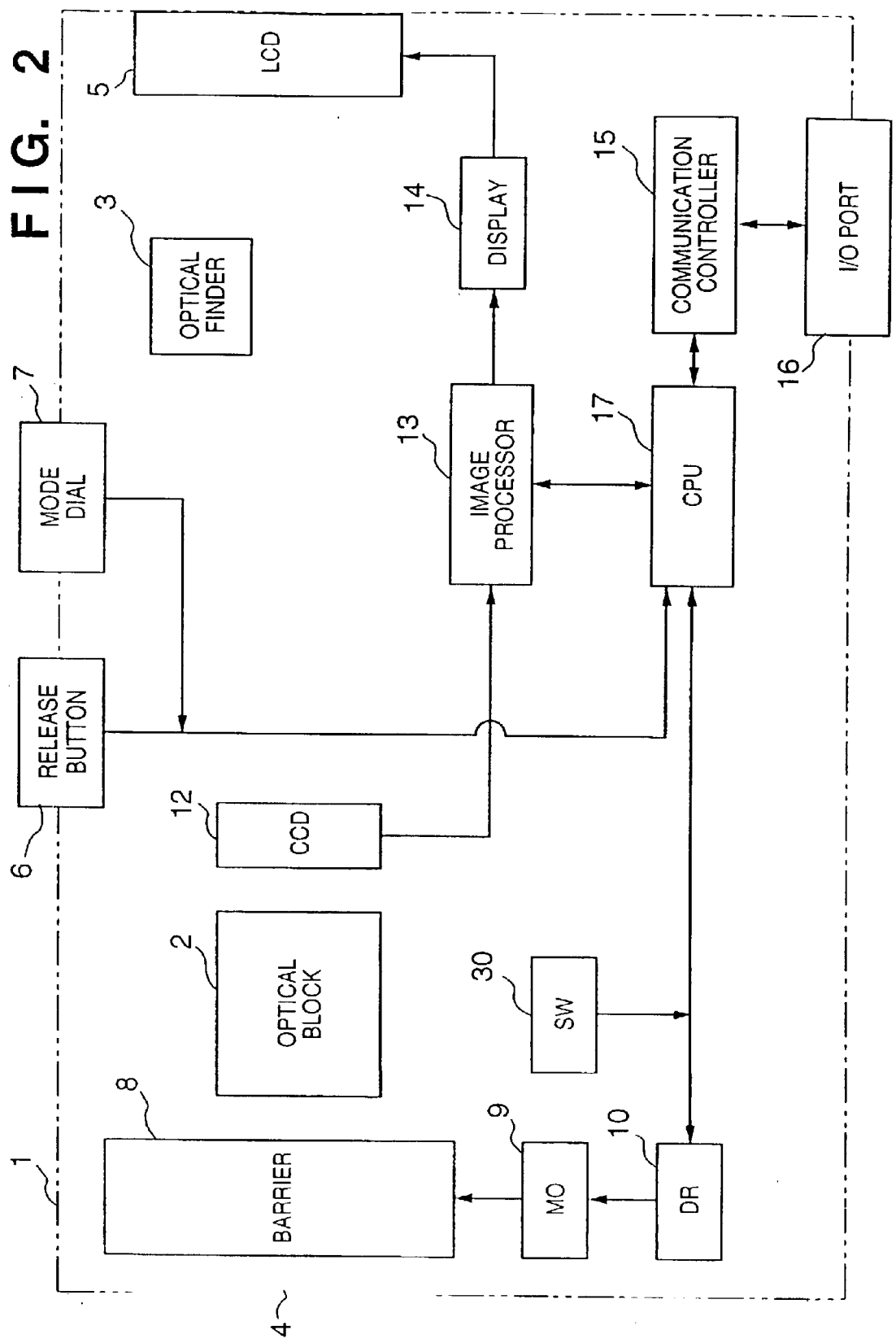
FIG. 2 is a block diagram showing the configuration of a digital camera of a preferred embodiment according to the present invention.
Figure 3:
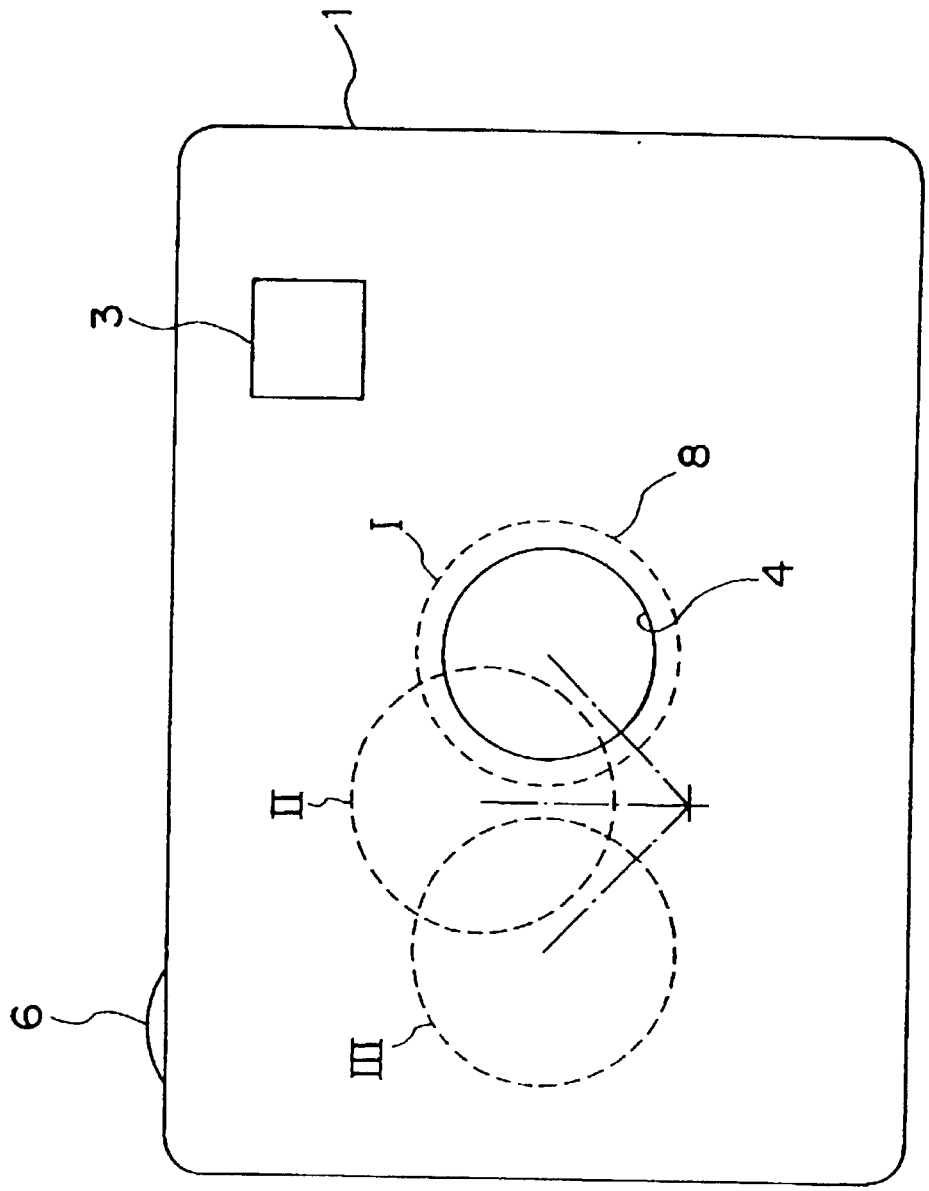
FIG. 3 is a view showing the positional relationship between the barrier and an opening of the camera illustrated in FIG. 2.

FIG. 2 is a block diagram showing the configuration of a digital camera best representing a recording/reproduction device according to the preferred embodiment of the present invention, while FIG. 3 illustrates the arrangement of a barrier and opening of the camera in FIG. 2.

In FIGS. 2 and 3, reference numeral 1 denotes a camera main body; 2, an optical block including a lens and lens barrel which comprise an optical system, an optical finder; 4, an opening formed in the main body 1 to allow light rays from an object to enter the optical block 2; 5, an LCD (Liquid Crystal Display) for displaying live images and reproduced images; 6, a release button for starting image-sensing. 7 denotes a mode dial which is manually operated by the user to switch modes (to be described later) of the camera. The user can operate the switch 7 from exterior of the camera.

Reference numeral 8 denotes a barrier for covering the opening 4; 9, a motor (MO) for driving the barrier 8; 10, a driver (DR) for controlling driving by the motor 9; 30, a switch unit which detects opening and closure of the barrier 8; 12, a CCD for converting an object image formed by the optical block 2 into an electrical signal; 13, an image processor for processing an output signal from the CCD 12 to produce an image signal; 14, a display unit for displaying the image signal from the image processor 13 on the LCD 5; 15, a communication controller for controlling communication with an external control device (not shown) such as a personal computer; 16, an I/O port as an interface to the external control device; and 17, a CPU for controlling operations of these units.

To explain the positional relationship between the barrier 8, the main body 1, and the optical block 2, the way the barrier 8 moves upon sensing will be described below with reference to FIG. 3.

The broken lines in FIG. 3 indicate the lens barrier 8 which pivots on a shaft 21 (to be described later with reference to FIG. 4). Referring to FIG. 3, I indicates a full closed state (to be referred to as a full close position hereinafter) of the opening 4, in which state the barrier 8 fully covers the opening 4; III, a full open state (to be referred to as a full open position hereinafter) of the opening 4, in which state the barrier 8 retracts from the opening 4 and the opening 4 is fully open; and II, a state in which the barrier 8 is intermediate between the full close position I and the full open position III.

The barrier 8 naturally has a larger diameter than the opening 4. Therefore, when the barrier 8 is in the full close position I, the barrier 8 fully covers the opening 4 to prevent foreign matter from entering the camera, user's fingers from touching the lens surface, and external light from entering the camera. When the barrier 8 is in the full open position III, the barrier 8 is completely separated from the opening 4 and hence does not cover the sensor surface.

A barrier mechanism as a driving system and transmission system of the barrier 8 of the embodiment will be described below with reference to FIGS. 4 and 5.

Figure 4:
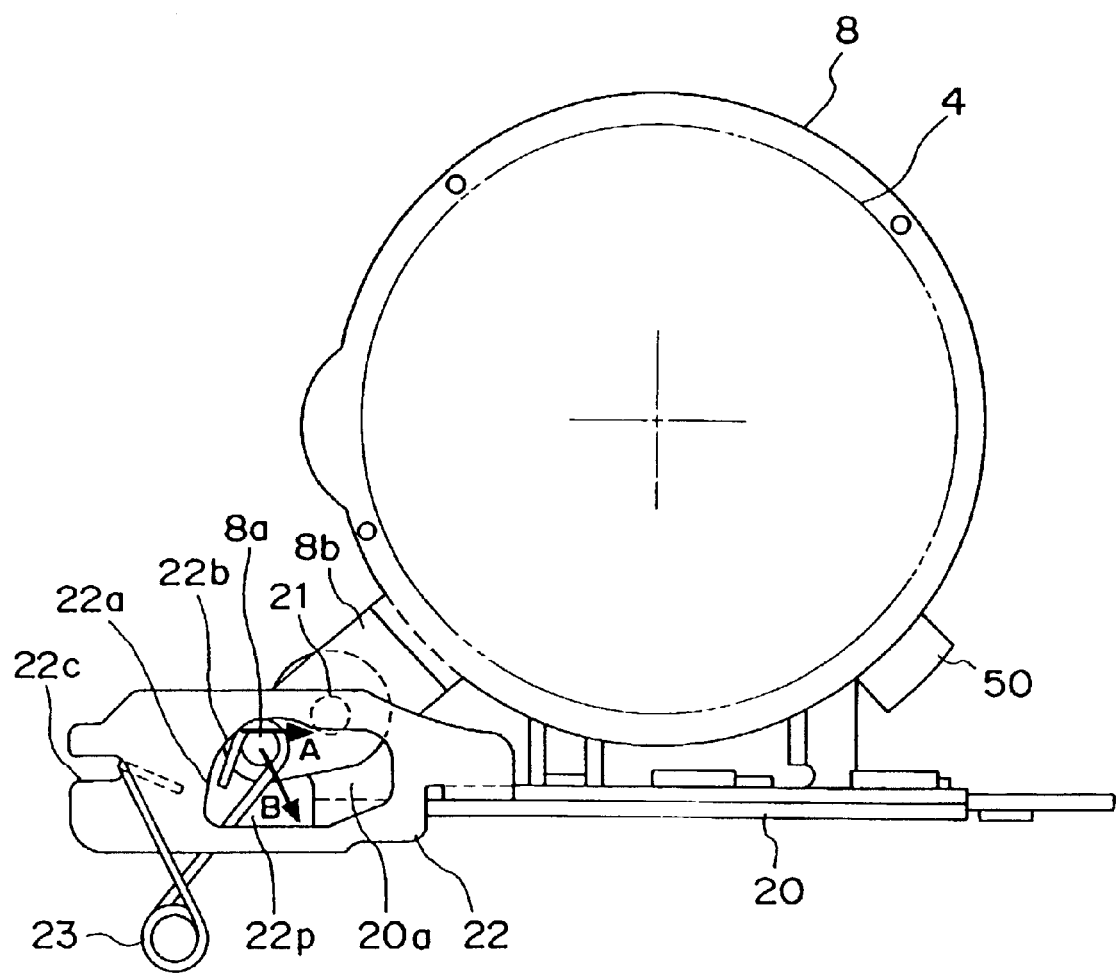
FIG. 4 is a front view of a barrier mechanism in a full closed state in the camera illustrated in FIG. 2.

FIG. 4 is a front view of the barrier mechanism when the camera is viewed frontways with the barrier 8 in the full close position. FIG. 5 is a top view of the barrier mechanism in FIG. 4. For the sake of simplicity of explanation, a driving mechanism such as a motor is not shown in FIG. 4, and the lens barrel is not shown in FIG. 5.

First, the barrier mechanism will be described below with reference to FIG. 5.

Figure 5:
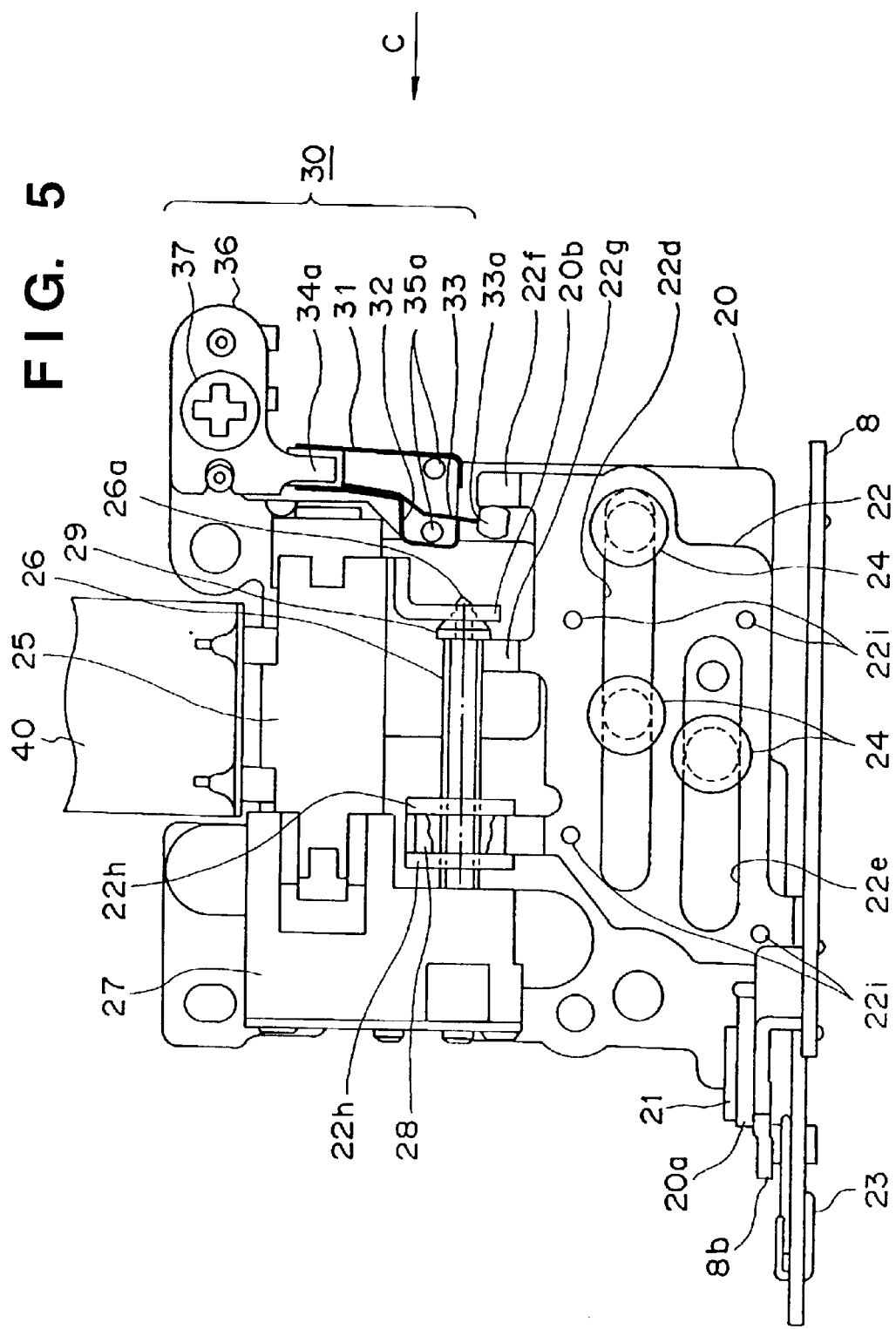
FIG. 5 is a top view of the barrier mechanism shown in FIG. 4.

In FIG. 5, reference numeral 20 denotes a barrier base for holding the barrier 8 so it is free to pivot. This barrier base 20 also holds parts pertaining to barrier driving (to be described later). Reference numeral 20*a* denotes an upright bent portion of the barrier base 20. A shaft 21 is caulked to a tag 8*b* of the barrier 8 with the upright bent portion 20*a* between them, so the barrier 8 is free to pivot.

Reference numeral 22 denotes a slider as a transmitting member; and 22*d* and 22*e*, slide grooves. Shafts 24 are caulked to the barrier base 20 with the slider 22 between them, thereby holding the slider 22 to be slidable in the lateral direction of the paper. The spacing between the shank of each shaft 24 and the slide groove 22*d* is minimized. This minimizes play of the slider in the longitudinal direction of the paper of FIG. 5.

The heads of the shafts 24 suppress play in the direction normal to the paper of FIG. 5. The width of the slide groove 24*e* is made much larger than the diameter of the shaft 24, so the shaft 24 does not come into slidable contact with the slide groove 22*e*. This prevents the slider 22 and the shaft 24 from interfering with each other. Pawls 22*f* and 22*g* protrude from the slider 22 so as to turn on and off a leaf SW (to be described later). A U-shaped upright bent portion 22*h* receives force transmitted from a nut 28 inserted between two upright plates of the upright bent portion 22*h*. Projections 22*i* of the slider 22 project into the paper of FIG. 5 and have spherical points. These projections 22*i* bring the barrier base 20 and the slider 22 into point contact, at four points, with each other, and this decreases the sliding resistance between them.

Reference numerals 25 and 26 denote a motor and screw, respectively, as a driving source of the barrier 8. The rotating speed of this motor 25 is reduced by gears (not shown) in a bear box 27. In the embodiment, a stepping motor is used as the motor 25.

A tip 26*a* of the screw 26 is rotatably supported by an upright bent portion 20*b* of the barrier base 20. A washer 29 with a tapered surface is inserted between the screw 26 and the bent portion 20*b*. A nut 28 meshes with the screw 26. A whirl-stop (not shown) of the nut 28 and a whirl-stop receiver (not shown) of the slider 22 engage with each other to regulate the rotation. A flexible circuit board 40 supplies electric power to the motor 25. When the motor 25 rotates, the speed of the rotation is reduced, and this rotation is transmitted to the screw 26, i.e., rotates the screw 26. When the screw 26 is thus rotated, the upright bent portion 22*h* moves sideways in the plane of the paper, and the slider 22 connected to the upright bent portion 22*h* also moves sideways in the plane of the paper. This sideway movement of the slider is the source of pivoting force of the barrier 8.

A leaf SW 30 as an opening/closing detecting means includes leaf contacts 31 and 32 and a common contact 33. The leaf contact 31 detects that the barrier 8 comes to the full open position. The leaf contact 32 detects that the barrier 8 comes to the full close position. When the slider 22 moves sideways as described above, the pawls 22*f* and 22*g* of the slider 22 move an insulating portion 33*a* at the end of the common contact 33 sideways. When the insulating portion 33*a* moves sideways, the common contact 33 comes in contact with the leaf contact 31 or 32. By detecting a signal from the leaf contact 31 or 32, it is possible to determine whether the common contact 33 is in contact with the leaf contact 31 or 32, the slider 22 has moved to the left or right, and the barrier 8 is in the full close or full open position.

The end portion 33*a* of the common contact 33 is insulated because a metal material is used as the slider 22 and the common contact 33 in the embodiment. The leaf contacts 31 and 32 are precharged to the left and right, respectively, in the plane of the paper and so positioned that their end portions press against a boss 35*a*. Details of the leaf SW 30 will be described later with reference to FIG. 6.

The barrier mechanism will be described below with reference to the front view of FIG. 4.

The slider 22 moves to the right (in the direction of an arrow A) in the plane of the paper by the rotation of the motor 25. Consequently, a tapered surface 22*a* or 22*b* formed inside an opening 22*p* pushes a pin 8*a* formed on the tongue-shaped piece 8*b* of the barrier 8 in the direction of an arrow B in FIG. 4, thereby opening the barrier 8. One end of a bias spring 23 as an elastic member in the preferred embodiment is locked by the pin 8*a* through the gap between the slider 22 and the barrier tongue-shaped piece 8*b*. The other end of this spring 23 is locked in a notch 22*c* of the slider 22. The bias spring 23 is so biased (precharged) as to bring its two end portions close to each other. In FIG. 4, therefore, the barrier 8 is forced to rotate clockwise around the shaft 21. Reference numeral 22*p* denotes a hole for allowing the pin 8*a* to move.

A stopper 50 abuts against the barrier 8 to regulate its full close position. In the embodiment, this stopper 50 is formed by protruding a portion of an optical block (not shown). However, the stopper 50 can also be formed on the main body cover or the barrier base 20.

Figure 6:
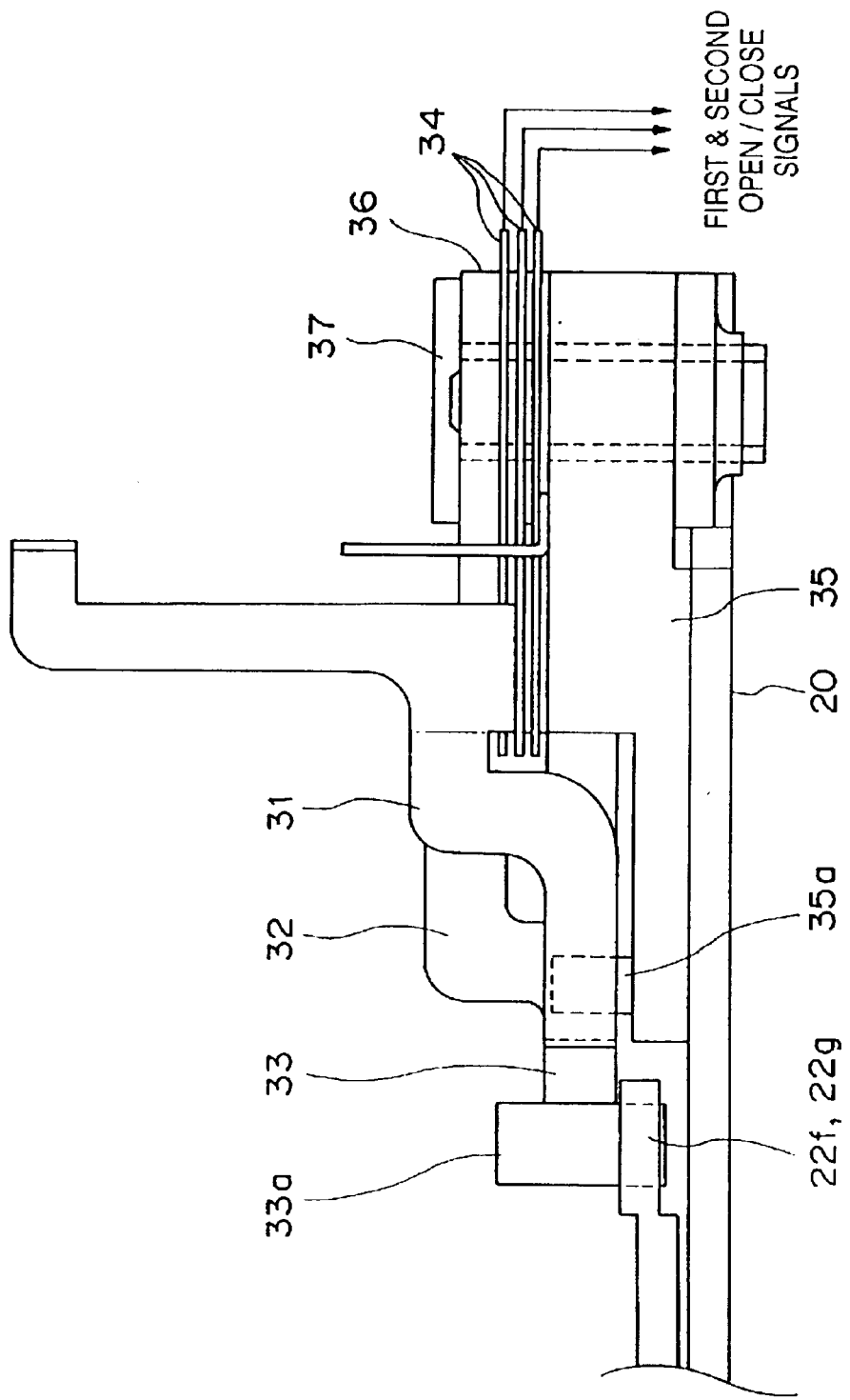
FIG. 6 is a side view showing the right-hand side of a leaf switch for detecting opening and closure of the barrier of the camera illustrated in FIG. 2.

FIG. 6 shows details of the construction of the leaf SW 30 when the barrier mechanism shown in FIG. 5 is viewed in the direction of an arrow C in FIG. 5.

In FIG. 6, reference numeral 34 denotes Mylar sheets for insulation. These three Mylar sheets 34 insulate the leaf contacts 31 and 32 from each other and insulate each of these leaf contacts 31 and 32 from the barrier base 20. A leaf base 35 fixes the leaf contacts 31 and 32 to the barrier base 20. A press plate 36 helps a machine screw 37 fix the leaf contacts 31 and 32, the Mylar sheets 34, and the leaf base 35. A shown in FIG. 6, the leaf contacts 31 and 32 are so formed that their proximal end portions are away from the barrier base 20 and their distal end portions are close to the barrier base 20. This is to prevent interference between the motion of the common contact and each leaf contact.

The end portions of the leaf contacts 31 and 32 extend outward while being insulated from each other by the Mylar sheets 34 and output first and second open/close signals, respectively. The CPU 17 shown in FIG. 2 detects these signals.

Operations of opening and closing the barrier 8 will be described below with reference FIGS. 4, 5, and 7 to 10.

Figure 7:
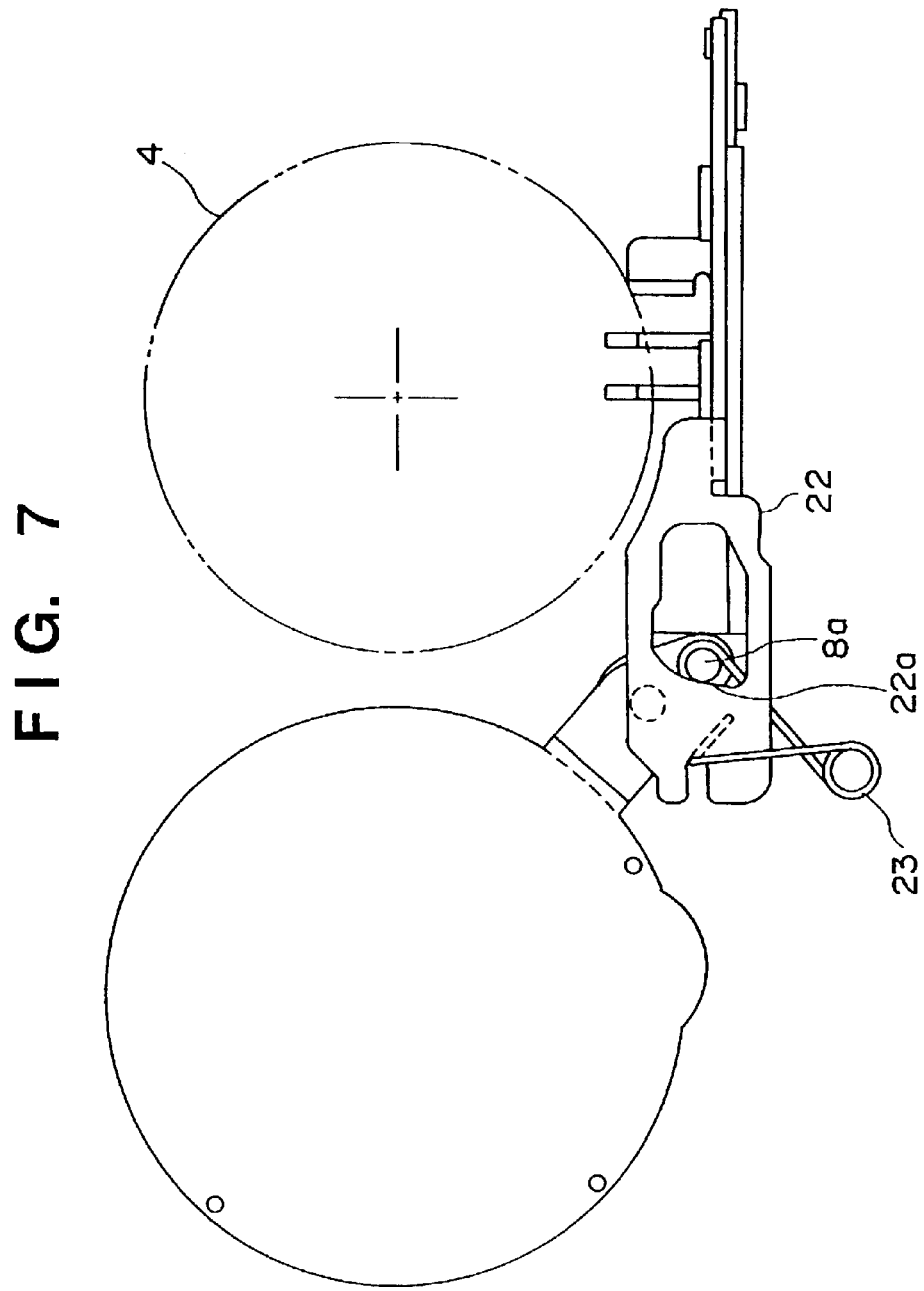
FIG. 7 is a front view of the barrier mechanism in a full open state in the camera illustrated in FIG. 2.
Figure 8:
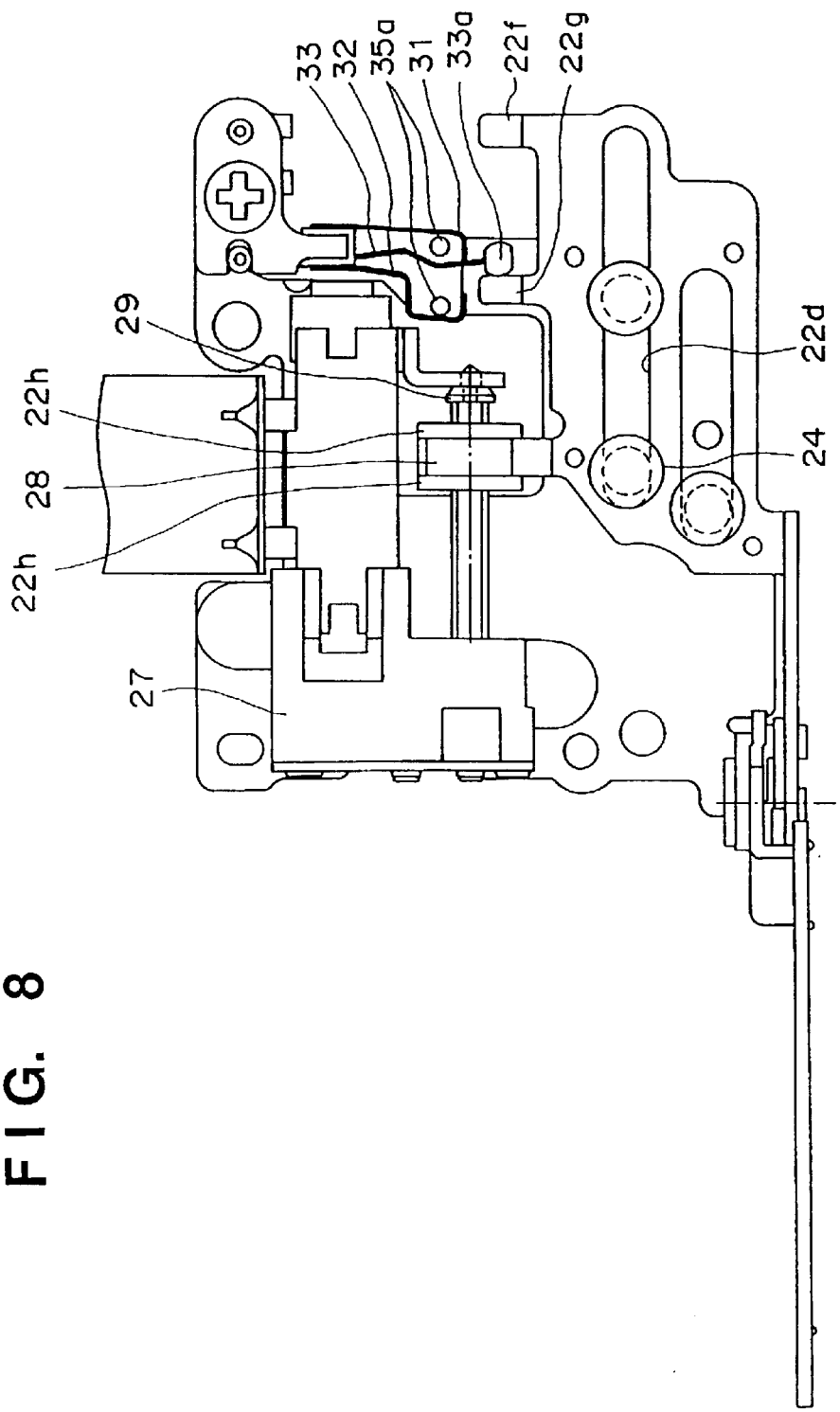
FIG. 8 is a top view of the barrier mechanism shown in FIG. 7.

FIGS. 4 and 5 are front and top views, respectively, of the barrier mechanism with the barrier 8 not open (fully closed) (in the position I shown in FIG. 3) when the power supply of the camera is OFF or the camera is in a reproduction mode (to be described later). FIGS. 7 and 8 are front and top views, respectively, of the barrier mechanism with the barrier 8 fully open (in the position III shown in FIG. 3) in a sensing mode or PC mode (to be described later).

Figure 9:
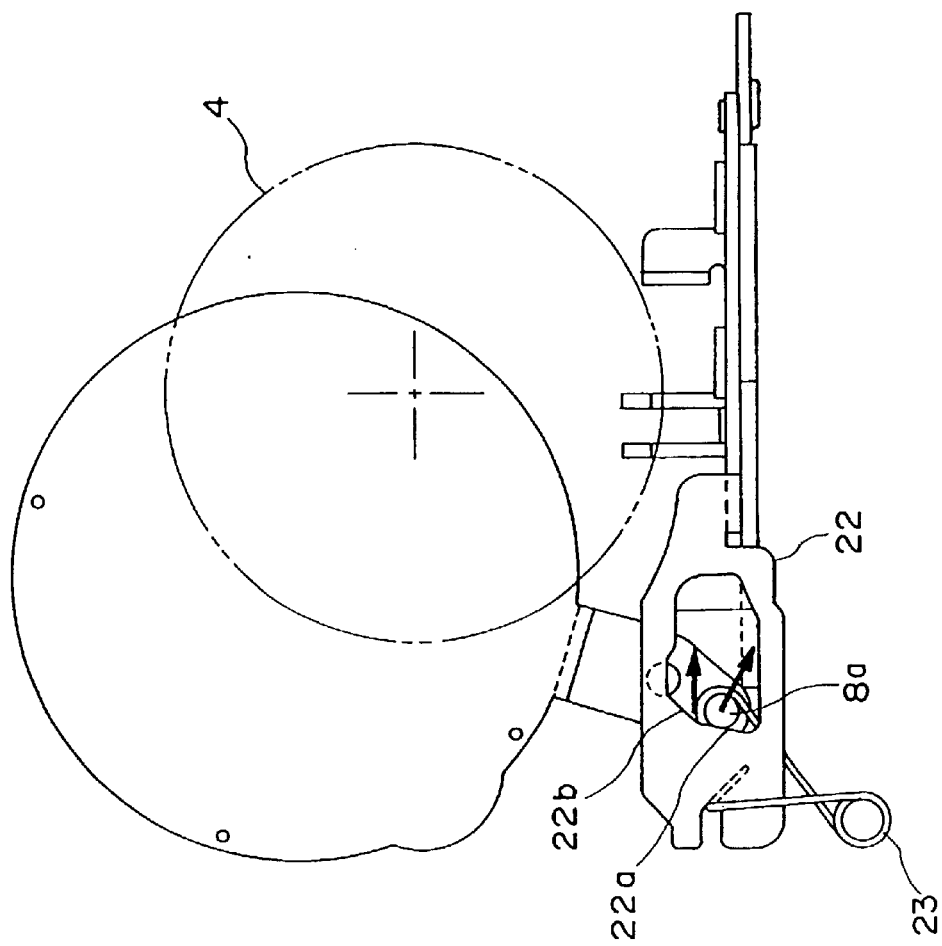
FIG. 9 is a front view of the barrier mechanism between the full open and full closed states in the camera illustrated in FIG. 2.
Figure 10:
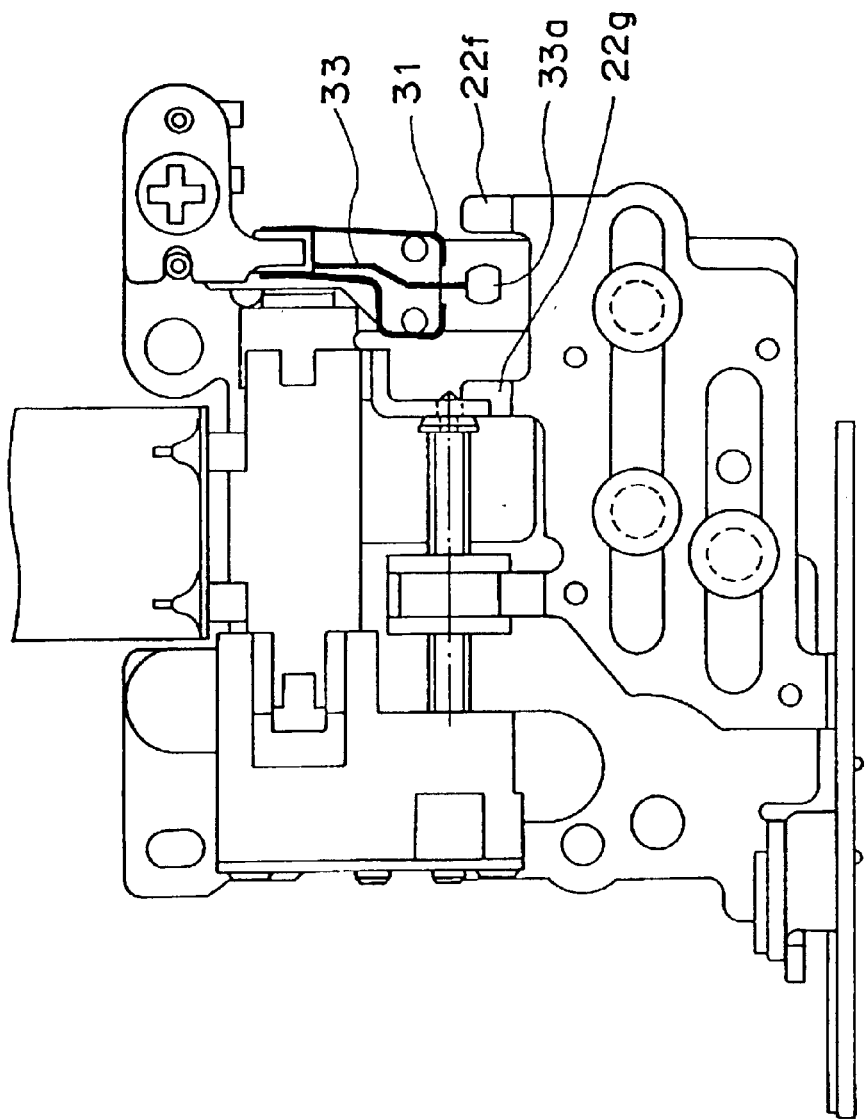
FIG. 10 is a top view of the barrier mechanism shown in FIG. 9.

FIGS. 9 and 10 are front and top views, respectively, of the barrier mechanism in the intermediate position (the position II shown in FIG. 3) between the full close and full open positions.

First, the state of the barrier 8 in each drawing will be described.

FIG. 9 shows the barrier 8 in the intermediate position II between the full close position I and the full open position III. When the barrier 8 is in the position II, as shown in FIG. 10, the common contact 33 is not in contact with either of the leaf contact 31 or 32. In this state, the CPU 17 shown in FIG. 2 detects that the barrier 8 is located between the full open position III and the full close position I on the basis of the first and second open/close signals from the switch 30. The pin 8a presses against the tapered surface 22a or 22b by the precharging force from the spring 23. As the slider 22 further moves to the left or right in the plane of the paper, the barrier 8 pivots accordingly.

Referring to FIGS. 4 and 5, if the pawl 22f of the slider 22 pushes the insulating portion 33a of the common contact 33 to bring the common contact 33 into contact with the leaf contact 32, the second open/close signal outputs a logical value "1", and the first open/close signal outputs a logical value "2". On the basis of these logical values of the signals, the CPU 17 detects that the barrier 8 is in the full close position I.

In the state shown in FIG. 4, the barrier 8 is regulated by the stopper 50 and hence cannot pivot any further. However, the slider 22 moves to the left in the plane of the paper more than that, so the tapered surface 22a of the slider 22 and the pin 8a are separated. Accordingly, the spring 23 is further charged.

Referring to FIGS. 7 and 8, if the pawl 22g of the slider 22 pushes the insulating portion 33a of the common contact 33 to bring the common contact 33 into contact with the leaf contact 31, the CPU 17 (FIG. 2) detects that these two contacts 33 and 31 are closed and that the barrier 8 is in the full open position III. In this state, the pin 8a keeps pressing against the tapered surface 22a of the slider 22.

A series of operations of the barrier 8 will be described below.

In the state shown in FIGS. 4 and 5, the spring 23 is charged as described previously. Therefore, the barrier 8 presses against the stopper 50 and hence can be reliably held closed regardless of the posture of the camera or vibrations while the camera is carried. A process of opening the barrier 8 by driving the motor 25 from this state will be described. Assume that rotation of the motor 25 in a direction in which the barrier 8 is opened is forward rotation.

Referring to FIG. 5, when the motor 25 rotates forward, the speed of the rotation is reduced by a pinion gear and intermediate gear (not shown), and the driving force is transmitted to a screw gear (not shown) formed integrally with the screw 26.

The smaller the screw diameter, the more efficiently the axial torque can be converted into axial force. When the screw diameter is decreased, however, hardly any difference can be maintained between the screw diameter and the screw tip diameter because the diameter of the screw tip 26a is limited.

Consequently, threads cannot be smoothened by cutting tapered surfaces at the end face of the screw tip 26a. So, the end faces of rough threads slide on the upright bent portion 20b to produce large resistance, or the two members scrape off each other. Therefore, the washer 29 is inserted between the screw 26 and the upright bent portion 20b to prevent the screw 26 from directly sliding on the upright bent portion 20b. Additionally, a washer surface that comes into contact with the screw 26 is roughened, and a washer surface which slides on the upright bent portion 20b is smoothened and tapered. This makes the washer 29 rotate together with the screw 26. This is to prevent abrasion by allowing the smooth surface to slide.

When the screw 26 rotates, the nut 28 is also bound to rotate. However, a whirl-stop is formed on the nut 28 as described earlier, and this converts the torque of the screw 26 into axial force which feeds the nut 28 to the right in the plane of the paper. The nut 28 pushes the upright bent portion 22h of the slider 22 to move the slider 22 to the right. When the slider 22 moves a slight distance, the common contact 33 and the leaf contact 32 move away from each other. Consequently, the leaf contact 32 does not close to either contact, and the CPU 17 detects that the barrier 8 is in the intermediate position between the full close and full open positions.

As shown in FIG. 4, when the slider 22 starts moving, the pin 8a and the tapered surface 22b are separated. Accordingly, the barrier 8 still presses against the stopper 50 by the charging force even when the slider 22 moves. After the slider 22 moves to bring the tapered surface 22a into contact with the pin 8a, the tapered surface 22b pushes the pin 8a, and the barrier 8 starts pivoting.

The rotating direction of the pin 8a from the full close position has a large angle to the moving direction of the slider 22. Therefore, when the barrier 8 starts opening, the force from the slider 22 is not efficiently transmitted to the barrier 8, so large driving force is necessary. This means easy occurrence of step-out since the motor 25 is a stepping motor.

To prevent this, the contact surface 22b which contacts at the beginning of opening makes large angle with the moving direction of the slider 22, thereby bringing the direction of force applied to the pin 8a close to the moving direction of the pin 8a. Consequently, the force is efficiently transmitted to allow the barrier 8 to start opening smoothly and reliably. In the preferred embodiment, the angle of the tapered surface 22b is set to about 45°. Also, if the motor 25 comprises a DC motor, decreasing the load decreases the current of the motor 25 and hence has an effect of saving energy.

Additionally, when the motor 25 is a stepping motor, the rotating speed and torque of the motor 25 are low immediately after the motor 25 starts rotating, so the motor 25 is unstable in this stage. At the beginning of opening, therefore, the slider 22 does not contact the barrier shaft 8a to allow the motor 25 to drive with low load. When the motor 25 stabilizes, the motor 25 is made to open the barrier 8. This prevents step-out of the stepping motor 25 and allows the motor 25 to operate smoothly and reliably.

Also, at the onset of opening the slider 22 is biased by the charging force of the spring 23 in the direction in which the barrier 8 opens. Since this force reduces the load at the beginning of opening, the barrier 8 can start opening more smoothly.

FIGS. 9 and 10 show the state in which the barrier 8 is in the intermediate position II between the full close and full open positions.

As shown in FIG. 9, after the barrier 8 starts opening and moves for a while, the contact surface 22a of the slider 22 is less tapered and is nearly perpendicular to the moving direction of the slider 22. This is because the moving direction of the pin 8a comes close to the moving direction of the slider 22, so the force can be transmitted more efficiently when the taper angle is reduced.

When the barrier 8 is driven, the charging force of the spring 23 does not produce any load. That is, the charging force is kept substantially constant because the spring 23 moves together with the slider 22 and the barrier pin 8a and the opening angle of the spring 23 is almost fixed during the movement. However, when the slider 22 moves after the barrier 8 abuts against the stopper 50 while closing, the load increases because the spring 23 is further charged.

FIGS. 7 and 8 show the completely opened (full open) state of the barrier 8.

When driving is continued from the intermediate position shown in FIGS. 9 and 10, the pawl 22g of the slider 22 pushes the common contact 33 and brings it into contact with the leaf 31. When the CPU 17 (shown in FIG. 2) detects closing of the contact, the CPU 17 stops motor 25 to terminate the opening operation of the barrier 8. The barrier 8 is so designed as to stop in a position where it is well retracted from the opening 4.

The stop position of the barrier 8 depends upon the timing of the leaf SW 30 described previously. This timing is largely influenced by various error factors such as the dimensional accuracy and mounting accuracy of the leaf contacts 31 and 32, dimensional accuracy of the pawls of the slider 22, positional accuracy of the tapered surface of the slider 22, positional accuracy of the pint 8a, and accuracy of the positional relationships between the individual components. Since the stop position of the barrier 8 is well separated from the opening 4, the aforementioned parts accuracy can be lowered, and this reduces the parts cost.

The leaf contacts 31 and 32 and the common contact 33 are made of a metal plate about 0.1 mm thick. When this metal plate is processed into complicated shapes as in the embodiment, the dimensional accuracy of each part is lowered. Hence, the leaf contacts 31 and 32 are positioned by making their end portions press against the boss 35a of the leaf base 35.

Accordingly, if the lengths of the end bent portions of the leaf contacts 31 and 32 are processed with high accuracy, the end portion of each contact can be accurately positioned with respect to the pawl of the slider 22. This is because the leaf base 35 is a molded product, so the boss can be formed with high positional accuracy by molding.

If the leaf SW 30 cannot detect the full open position for some reason while the barrier 8 is opening, or, if the motor 25 does not stop driving although the leaf SW 30 detects the full open position, the slider 22 may keep moving. In the worst case, the end portion of the slide groove 22d bites the shaft 24, or the upright bent portion 22h of the slider 22 abuts against the washer 29 or the gear box 27 to cause the screw 26 and the nut 28 to interfere with each other. If this is the case, neither forward rotation nor reverse rotation is possible. To prevent this, in the embodiment the common contact 33 abuts against a boss 35a (FIG. 5) to produce large load, preventing any further movement of the slider 22. The same arrangement is used on the closing side.

If disturbance is inflicted on the barrier 8 while it is opening, e.g., if a user holds the barrier 8 with his or her finger, the load acts on the motor 25 via the screw 26 and the like because the slider 22 is directly pushing the pin 8a. In the worst case, the motor 25 steps out. A stepping motor can originally control the range of movement of the barrier 8 by the number of driving steps. However, once a stepping motor steps out, the position of the barrier 8 becomes unknown, so the leaf SW 30 for detecting the full open position is necessary to recover after that.

The barrier 8 is closed from the state shown in FIGS. 7 and 8.

Referring to FIGS. 7 and 8, when the slider 22 moves, the spring 23 is biasing the pin 8a, so the pin 8a pivots the barrier 8 while it presses against the tapered surface 22a. When driving is continued, the barrier 8 abuts against the stopper 50, and the pivotal movement is regulated. In this state, the leaf contact 32 for detecting full closure and the common contact 33 are not in contact with each other yet.

When driving by the motor 25 is further continued, the pawl 22f of the slider 22 pushes the common contact 33 to bring it into contact with the leaf contact 32. The CPU 17 (FIG. 2) detects closure of the contact and stops driving by the motor 25. Consequently, the state returns to the full close position I shown in FIGS. 4 and 5. Since the opening angle of the spring 23 is large, the spring 23 is further charged. The leaf contacts 33 and 32 are so designed as to close after the barrier 8 is stopped and driven a predetermined amount. Therefore, even if the timing of conduction slightly changes due to specific parts accuracy of the parts as mentioned earlier, the barrier 8 is reliably closed.

If the barrier 8 is held by a finger or the like while moving in the closing direction, the slider 22 keeps moving, against the biasing force of the spring 23, to the left in the plane of the paper while further charging the spring 23. If this driving force is sufficiently strong, the slider 22 moves until the leaf SW 30 makes a circuit, and then stops driving.

Afterward, when the finger is removed from the barrier 8, the charging force of the spring 23 returns the barrier 8 to the full close position I. If the driving force is insufficient, the motor 25 steps out and hence cannot stop driving in the full close position as in the opening operation. Accordingly, the leaf SW 30 for detecting the full close position is necessary.

Caution should be exercised as follows in stopping motor driving in the above explanation.

When the stepping motor 25 is abruptly stopped, it often stops with the phases of its internal coil and magnet closest to each other. Therefore, the stepping motor 25 sometimes stops after rotating in the reverse direction to the direction before the stoppage. In this state, if driving of the motor 25 is stopped instantaneously after the contact 31 of the leaf SW 30 makes a close circuit with the contact 32, the slider 22 may move a slight distance in the reserve direction to open the leaf contacts 31 and 32. Accordingly, driving is continued for a predetermined time period after the moment that the contact 31 is close with the contact 32, so as to slightly charge the leaf contacts 31 and 32, and then driving by the motor 25 is stopped. In this way the leaf contacts 31 and 32 reliably close.

A state in which the barrier 8 in the full close position is forced to open will be described below.

Figure 11:
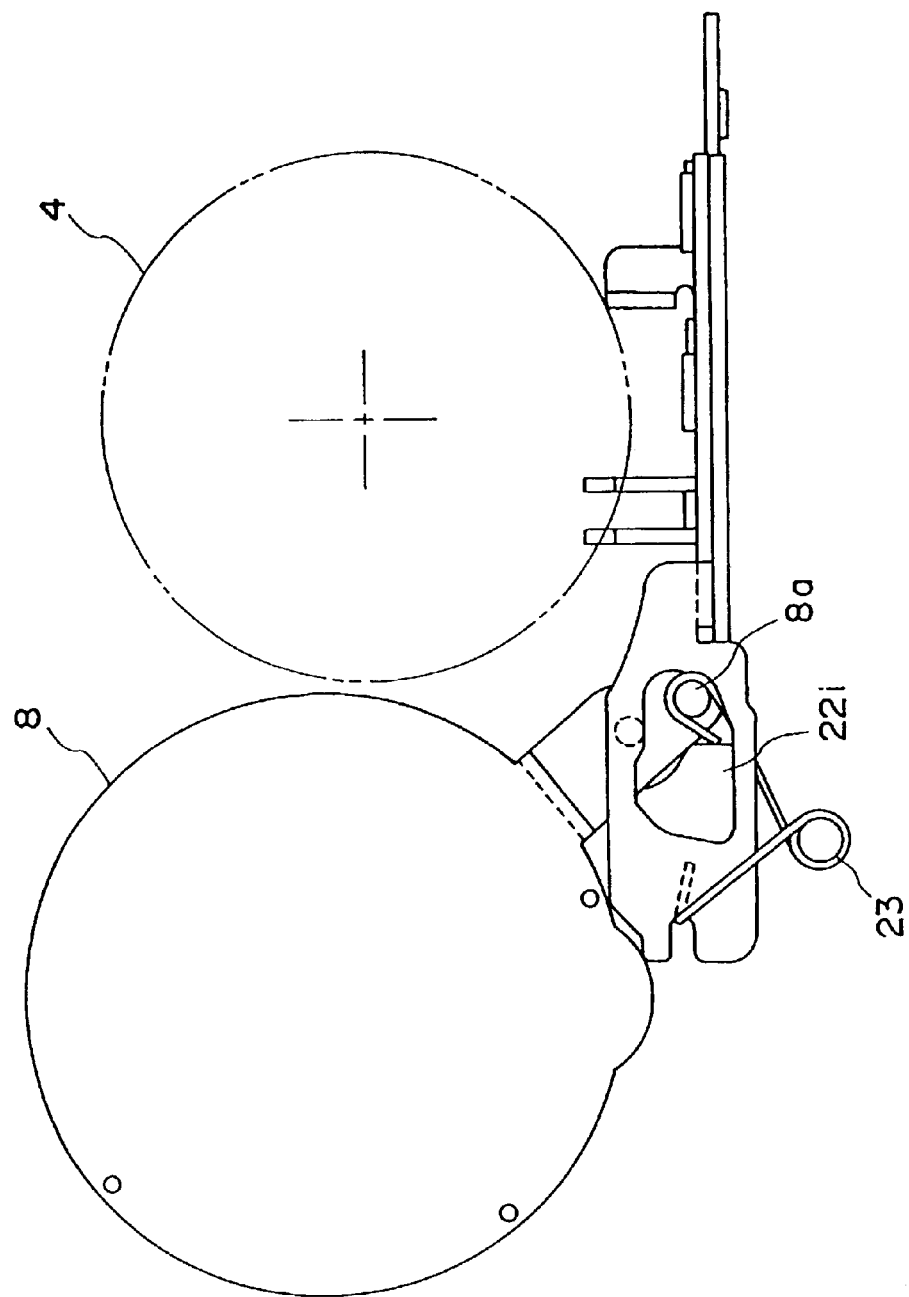
FIG. 11 is a front view when the barrier mechanism in the full closed state is forced to open in the camera illustrated in FIG. 2.

FIG. 11 shows the state in which the barrier 8 in the full close position is forced to open. Even if the barrier 8 is completely retracted from the opening 4, no external force directly acts on the driving system because the spring 23 charges. Also, the hole 22i is formed in the slider 22 to allow movement of the pin 8a which pivots together with pivot of the barrier 8. Therefore, no excessive force is inflicted on the barrier 8 or the slider 22.

The spring 23 can bias the barrier 8 in the opening direction, which is opposite to the closing direction, as in the embodiment. When external load on the barrier 8 is taken into consideration, however, it is desirable to bias in the closing direction as in the embodiment.

Next, camera modes will be described with reference to FIG. 12.

Figure 12:
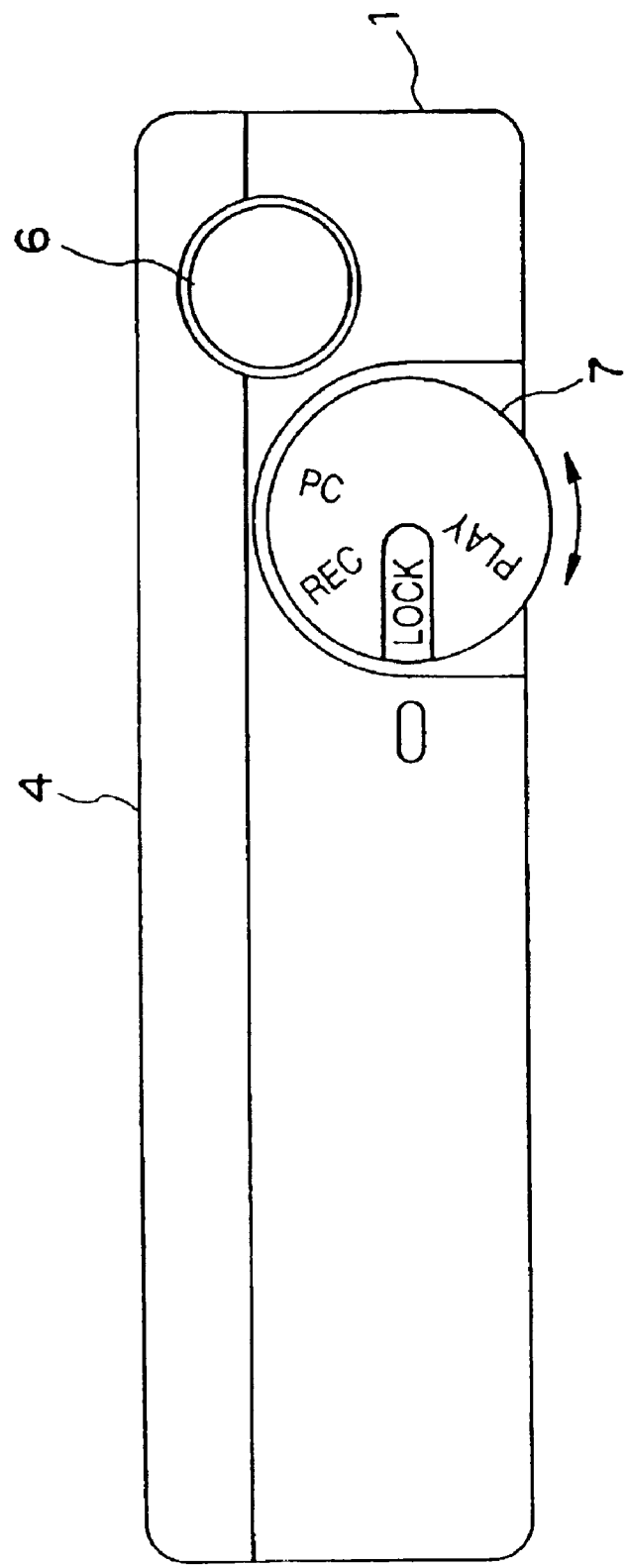
FIG. 12 is a top view of a mode switching dial of the camera illustrated in FIG. 2.

FIG. 12 is a top view of the mode dial 7 provided on the upper surface of the camera. The camera of the embodiment has a LOCK mode in a power OFF state, a REC (recording) mode as a sensing, a PLAY (reproduction, display) mode as a reproduction mode, and a PC mode as a controllable mode. A means for switching these modes is of course not limited to the dial switch.

The respective modes in FIG. 12 have the meanings as follows.

LOCK mode: power is OFF.

REC mode: sensing by which depression of the release button 6 (FIGS. 2 and 3) is detected and an image is input from the CCD 12 (FIG. 2) is possible. More specifically, a user can sense an object while monitoring a live image (successively input by the CCD 12) displayed on the LCD 5 or sense an object while checking the object through the optical finder with the LCD 5 turned OFF.

PLAY mode: reproduction by which image data stored in a storage medium (not shown) is read out and displayed on the LCD 5 or an external display device is possible.

PC mode: the camera can be connected to an external computer. For example, the camera is connected to an external computer and exchanges image data with the computer, or the computer instructs the camera to sense.

The opening/closing operation of the barrier 8 in a camera with the above-mentioned modes will be described below.

<Control Procedure > . . . First Example

Figure 13:
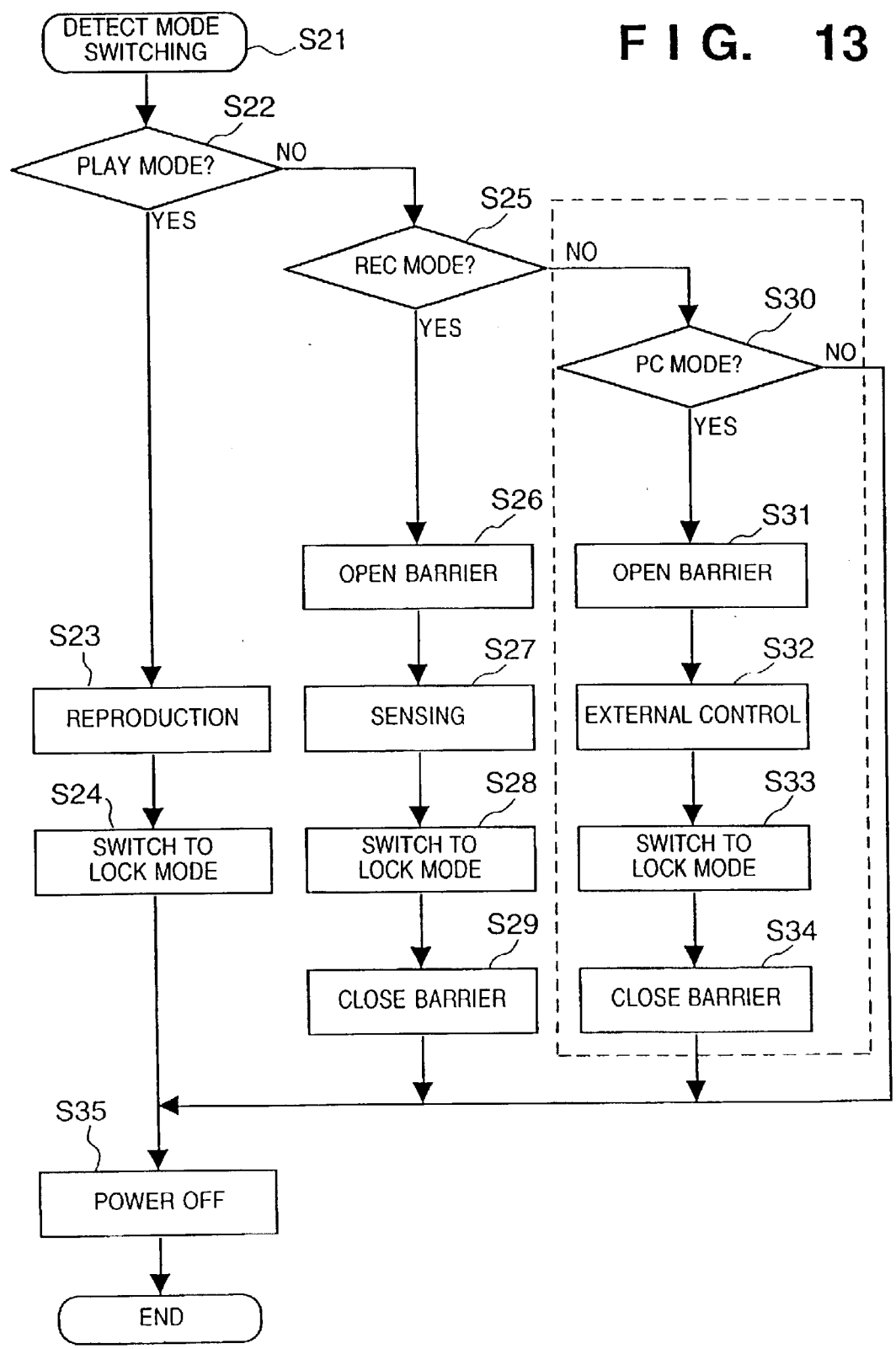
FIG. 13 is a flow chart showing an operation sequence of a CPU for opening/closing the barrier of the illustrated in FIG. 2.

FIG. 13 is a flow chart showing the opening/closing operation sequence of the barrier 8 of a camera having the REC mode, PLAY mode, and PC mode, which sequence is controlled by the CPU 17.

In step S21, the CPU 17 detects switching by the mode dial 7. If the PLAY mode is set (step S22), the CPU 17 displays a recorded image on the LCD 5 or the like (step S23). If the mode is switched to the LOCK mode after that (step S24), the CPU 17 turns off the power supply (step S35) and completes the operation. In step S21, the CPU 17 detects switching by the mode dial 7, and when it is decided that the REC mode is set (step S25), the CPU 17 opens the barrier 8 (step S26) to image-sense (step S27). During sensing an image, the barrier is kept open. If the mode is switched to the LOCK mode after that (step S28), the CPU 17 closes the barrier 8 (step S29), turns off the power supply (step S35), and completes the operation.

As described above, the barrier 8 is closed while images are reproduced. As a result, even when a user is watching the LCD 5 while carrying the camera, he or she does not touch the lens of the camera by mistake. Also, the barrier 8 is closed except when necessary to decrease the possibility of foreign matter such as dust particles entering the camera or to protect the image sensing element or CCD 12 from being sun-baked.

After detecting the status of the dial 7 in step S21, where it is decided that the PC mode is set (step S30), the CPU 17 opens the barrier 8 (step S31) and accepts control from an external computer (step S32). The barrier 8 is kept open while images are sensed, or transferred to external computers.

If the mode is switched to the LOCK mode after that (S33), the CPU 17 closes the barrier 8 (S34), turns off the power supply (S35), and completes the operation. As described above, the barrier 8 opens immediately after the mode is switched to the PC mode. Accordingly, it is possible to provide a camera with high response speed which can sense immediately after receiving a sensing instruction signal from an external computer and hence does not loose a shutter chance.

If the CPU 17 detects the LOCK mode (NO decision) in step S30 after detecting the status of the dial 7, the CPU 17 turns off the power supply (S35), and then terminates the control.

<Control Procedure> . . . Second Example

Figure 14:
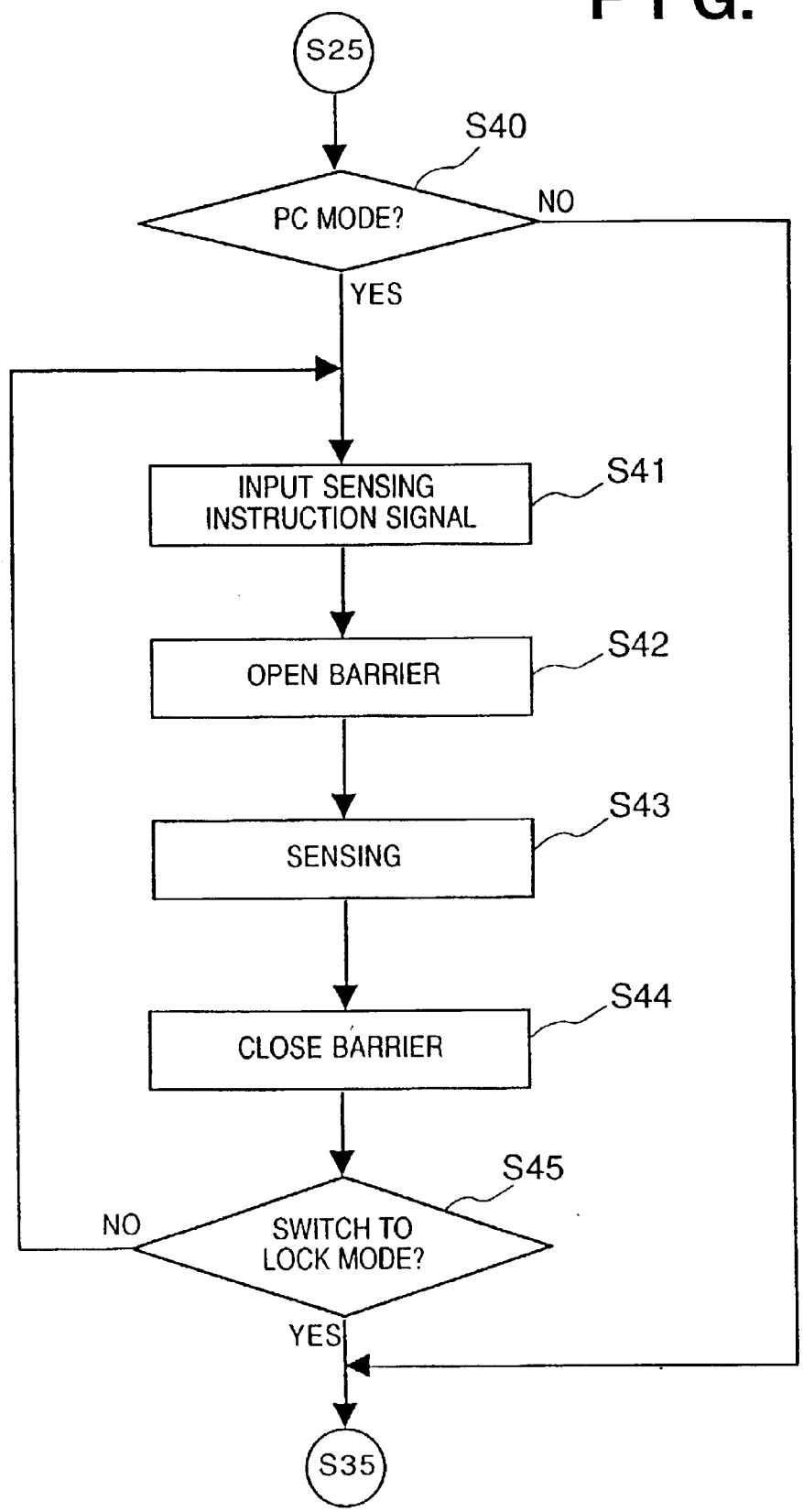
FIG. 14 is a flow chart showing another operation sequence of the CPU a flow chart CPU for opening/closing the barrier of the illustrated in FIG. 2, which flowchart being similar to FIG. 13 except steps enclosed by the broken lines.

FIG. 14 is a flow chart showing the opening/closing operation sequence of the barrier 8, which is the same as FIG. 13 except for steps enclosed with the broken lines. The sequence is controlled by the CPU 17.

If it is determined in step S40 of FIG. 14 that the PC mode is set, the CPU 17 waits for a sensing instruction signal. If a sensing instruction signal is input (step S41), the CPU 17 opens the barrier 8 (step S42) to sense (step S43). After completing the sensing, the CPU 17 immediately closes the barrier 8 (step S44). If the mode is switched to the LOCK mode (step S45), the CPU 17 turns off the power supply (step S35) and completes the operation.

Although not shown, the barrier 8 is kept closed where operations except for image-sensing, such as image-transfer operations in the PC mode, are being performed.

As described above, sensing is not only camera operation in the PC mode, so the barrier 8 opens only when an image is sensed. This protects the lens of the camera and prevents dust particles and the like from entering the camera main body.

<Control Procedure> . . . Third Example

Figure 15:
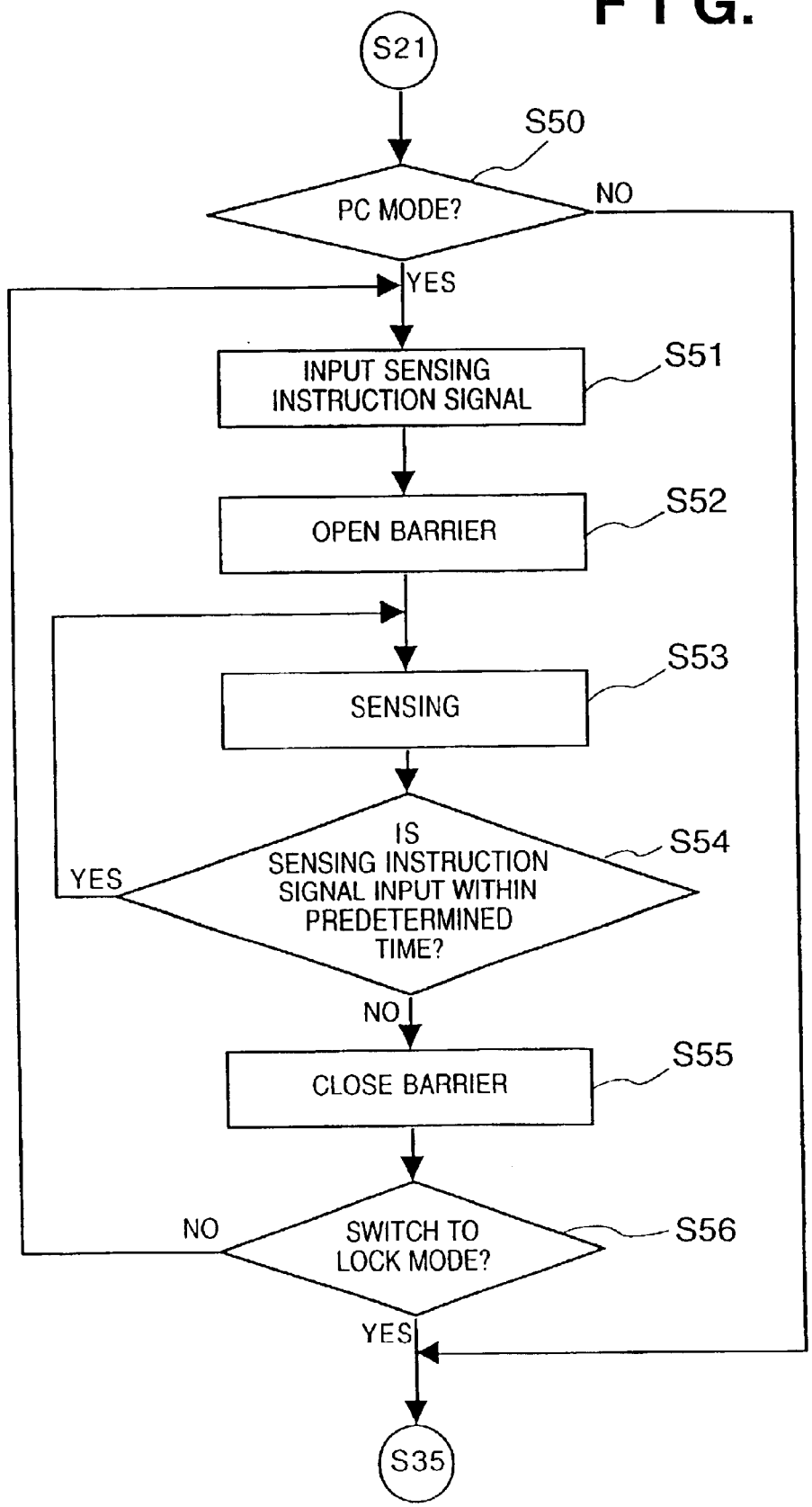
FIG. 15 is a flow chart showing yet another operation sequence of the CPU a flow chart CPU for opening/closing the barrier of the illustrated in FIG. 2, which flowchart being similar to FIG. 13 except steps enclosed by the broken lines.

FIG. 15 is a flow chart showing the opening/closing operation sequence of the barrier 8, which is the same as FIG. 13 except for the steps enclosed with the broken lines. The operation is controlled by the CPU 17 as in the example of FIG. 14.

If the PC mode is set in FIG. 13, the CPU 17 waits for a sensing instruction signal. If a sensing instruction signal is input (step S51), the CPU 17 opens the barrier 8 (step S52) to sense (step S53). If a sensing instruction signal is again input within a predetermined time after the sensing is complete (step S54), the CPU 17 senses without closing the barrier 8 (step S53). Elapse of the predetermined time is monitored by an internal timer of the CPU 17 (not shown). If no sensing instruction signal is input within the predetermined time after the sensing is complete, the CPU 17 closes the barrier 8 (step S55). If the mode is switched to the LOCK mode (step S56), the CPU 17 turns off the power supply (step S35) and completes the operation.

As described above, if the next sensing instruction signal is input within the predetermined time, the barrier 8 is kept open. This saves the power for opening and closing the barrier 8. Also, since sensing can be done as soon as a sensing instruction signal is input, a camera with high response speed can be provided. Furthermore, the barrier 8 is closed when sensing is not continuously done, so the lens of the camera can be protected except when necessary.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The embodiments as set forth can be modified in various ways.

The embodiments comprise the PC mode, for example, as an external control mode. The present invention can be extended to other external control modes such as a remote control mode using a remote controller.

In the embodiments described above, the camera is connected to an external computer system in the PC mode, thus providing the camera externally controlled by PC's. However, the present invention is not limited to a cable connection between them. Alternatively, a cable-less connection, such as radio wave communication or infrared ray communication may be applied.

Further, in the embodiments as set forth, switching into the PC mode is made through the dial. In other words, the switching to the PC mode does not occur without operating the dial. However, the invention is not limited to such manual switching. The embodiments can be modified so that a connection between the camera and PC is automatically recognized, thus eliminating the manual operation of dial.

Yet further, the software and/or hardware configurations, for example, maybe replaced or substituted in suitable manner.

Further, the present invention can be constituted of any combinations of the above described embodiments, as the occasions demand. Further, the present invention can be constituted of necessary components of any ones of the above described embodiments, as the occasions demand.

Yet further, the present invention can be applied to a device unit comprising the entire or partial structure of the claimed apparatus or embodied apparatus. Furthermore, the invention may be applied to a system wherein they are combined with another unit, or to a component comprised of an apparatus.

The present invention can be applied yet further to digital still cameras, video cameras, various types of cameras such as cameras using silver-salt films, any types of image sensing devices or optical devices except for cameras, and other types of devices. It can be further applied to a device which is applied to the cameras, optical devices and the other types of devices, or to any component comprising the cameras, the optical devices and the other types of devices.

What is claimed is:

1. An image sensing apparatus comprising:
   a protection cover for protecting an image sensing optical system;
   a cover driving device driving said protection cover; and
   a determination device judging at least whether said image sensing apparatus is in a first state of being functionally connected with an external unit and whether said image sensing apparatus is in a second state for image sensing without being functionally connected with the external unit, individually, said determination device also determining an operation of said cover driving device in accordance with a judgment result of said determination device.

2. An image sensing apparatus according to claim 1, wherein in a case where said determination device judges that said image sensing apparatus is in the first state, said determination device causes said cover driving device to open said protection cover.

3. An image sensing apparatus according to claim 1, wherein said determination device causes said cover driving device to open said protection cover, in a case where said determination device judges that said image sensing apparatus is in the first state, in response to a reception of a signal related to image sensing start from the external unit.

4. An image sensing apparatus according to claim 3, wherein said determination device causes said cover driving device to close said protection cover in response to a completion of an image sensing operation of said image sensing apparatus.

5. An image sensing apparatus according to claim 3, wherein said determination device comprises a timer for causing said cover driving device to close said protection cover a predetermined time period after a completion of an image sensing operation of said image sensing apparatus.

6. An image sensing apparatus according to claim 5, wherein in a case where the signal related to image sensing start is received again from the external unit during the predetermined time period, said determination device prevents said cover driving device from closing said protection cover after the predetermined time period elapses.

7. An image sensing apparatus according to claim 1, wherein said determination device prevents said cover driving device from opening said protection cover in a case where said determination device judges that said image sensing apparatus is in the first state.

8. An image sensing apparatus according to claim 1, wherein in a case where said determination device judges that said image sensing apparatus is in the first state, said determination device causes said cover driving device to close said protection cover in response to a completion of an image sensing operation of said image sensing apparatus.

9. An image sensing apparatus according to claim 1, wherein said determination device comprises a timer for causing said cover driving device to close said protection cover a predetermined time period after a completion of an image sensing operation of said image sensing apparatus, in a case where said determination device judges that said image sensing apparatus is in the first state.

10. An image sensing apparatus according to claim 9, wherein in a case where the signal related to image sensing start is received again from the external unit during the predetermined time period, said determination device prevents said cover driving device from closing said protection cover after the predetermined time period elapses.

11. An image sensing apparatus according to claim 1, wherein in a case where said determination device judges that said image sensing apparatus is in a third state for reproduction, said determination device prevents said cover driving device from opening said protection cover.

12. An image sensing apparatus according to claim 1, further comprising:
an operation device for selectively setting said apparatus into at least the first and second states, said operation device being provided at a position where a user can operate said operation device.

13. An image sensing apparatus according to claim 1, further comprising:
a signal processing device converting an optical image formed by the optical system into an electrical signal for display in a case where said image sensing apparatus is in the second state.

14. An image sensing apparatus according to claim 1, wherein said determination device judges a state controlled by an external computer as the first state.

15. An image sensing apparatus according to Claim 1, wherein in a case where said determination device judges that said image sensing apparatus is released from the first state, said determination device causes said cover driving device to close said protection cover.

16. A camera comprising:
a protection cover for protecting a photographing optical system;
a cover driving device driving said protection cover; and
a determination device judging at least whether said camera is in a first state of being functionally connected with an external unit and whether said camera is in a second state for photographing without being functionally connected with the external unit, individually, said determination device also determining an operation of said cover driving device in accordance with a judgment result of said determination device.

17. A camera according to claim 16, wherein in a case where said determination device judges that said camera is in the first state, said determination device causes said cover driving device to open said protection cover.

18. A camera according to claim 17, wherein in a case where said determination device judges that said camera is released from the first state, said determination device causes said cover driving to close said protection cover.

19. A camera according to claim 16, wherein said determination device causes said cover driving device to open said protection cover, in a case where said determination device judges that said camera is in the first state, in response to a reception of a signal related to photographing start from the external unit.

20. A camera according to claim 19, wherein said determination device causes said cover driving device to close said protection cover in response to a completion of a photographing operation of said camera.

21. A camera according to claim 19, wherein said determination device comprises a timer for causing said cover driving device to close said protection cover a predetermined time period after a completion of a photographing operation of said camera.

22. A camera according to claim 21, wherein in a case where the signal related to photographing start is received again from the external unit during the predetermined time period, said determination device prevents said cover driving device from closing said protection cover after the predetermined time period elapses.

23. A camera according to claim 19, wherein said determination device prevents said cover driving device from opening said protection cover in a case where said determination device judges that said camera is in the first state.

24. A camera according to claim 19, wherein in a case where said determination device judges that said camera is in the first state, said determination device causes said cover driving device to close said protection cover in response to a completion of a photographing operation of said camera.

25. A camera according to claim 19, wherein said determination device comprises a timer for causing said cover driving device to close said protection cover a predetermined time period after a completion of a photographing operation of said camera, in a case where said determination device judges that said camera is in the first state.

26. A camera according to claim 25, wherein in a case where the signal related to photographing start is received again from the external unit during the predetermined time period, said determination device prevents said cover driving device from closing said protection cover after the predetermined time period elapses.

27. A camera according to claim 19, wherein in a case where said determination device judges that said camera is in a third state for reproduction, said determination device prevents said cover driving device from opening said protection cover.

28. A camera according to claim 19, further comprising:
an operation device for selectively setting said apparatus into at least the first and second states, said operation device being provided at a position where a user can operate said operation device.

29. A camera according to claim 19, further comprising:
a signal processing device converting an optical image formed by the optical system into an electrical signal for display in a case where said camera is in the second state.

30. A camera according to claim 19, wherein said determination device judges a state controlled by an external computer as the first state.

31. An image sensing apparatus comprising:
a protection cover for protecting an image sensing optical system;
a cover driving device driving said protection cover; and
a determination device judging at least whether said image sensing apparatus is set in a first mode for being functionally connected with an external unit and whether said image sensing apparatus is set in a second mode for image sensing without being functionally connected with the external unit, individually, said determination device also determining an operation of said cover driving device in accordance with a judgment result of said determination device.

32. An image sensing apparatus according to claim 31, wherein in a case where said determination device judges that said image sensing apparatus is set in the first mode, said determination device causes said cover driving device to open said protection cover.

33. An image sensing apparatus according to claim 31, wherein said determination device causes said cover driving device to open said protection cover, in a case where said determination device judges that said image sensing apparatus is set in the first mode, in response to a reception of a signal related to image sensing start from the external unit.

34. An image sensing apparatus according to claim 33, wherein said determination device causes said cover driving device to close said protection cover in response to a completion of an image sensing operation of said image sensing apparatus.

35. An image sensing apparatus according to claim 33, wherein said determination device comprises a timer for causing said cover driving device to close said protection cover a predetermined time period after a completion of an image sensing operation of said image sensing apparatus.

36. An image sensing apparatus according to claim 35, wherein in a case where the signal related to image sensing start is received again from the external unit during the predetermined time period, said determination device prevents said cover driving device from closing said protection cover after the predetermined time period elapses.

37. An image sensing apparatus according to claim 31, wherein said determination device prevents said cover driving device from opening said protection cover in a case where said determination device judges that said image sensing apparatus is set in the first mode.

38. An image sensing apparatus according to claim 31, wherein in a case where said determination device judges that said image sensing apparatus is set in the first mode, said determination device causes said cover driving device to close said protection cover in response to a completion of an image sensing operation of said image sensing apparatus.

39. An image sensing apparatus according to claim 31, wherein said determination device comprises a timer for causing said cover driving device to close said protection cover a predetermined time period after a completion of an image sensing operation of said image sensing apparatus, in a case where said determination device judges that said image sensing apparatus is set in the first mode.

40. An image sensing apparatus according to claim 39, wherein in a case where the signal related to image sensing start is received again from the external unit during the predetermined time period, said determination device prevents said cover driving device from closing said protection cover after the predetermined time period elapses.

41. An image sensing apparatus according to claim 31, wherein in a case where said determination device judges that said image sensing apparatus is set in a third mode for reproduction, said determination device prevents said cover driving device from opening said protection cover.

42. An image sensing apparatus according to claim 31, further comprising:
an operation device for selectively setting said apparatus into at least the first and second modes, said operation device being provided at a position where a user can operate said operation device.

43. An image sensing apparatus according to claim 31, further comprising:
a signal processing device converting an optical image formed by the optical system into an electrical signal for display in a case where said image sensing apparatus is set in the second mode.

44. An image sensing apparatus according to claim 31, wherein said determination device judges a mode controlled by an external computer as the first mode.

45. An image sensing apparatus according to claim 31, wherein in a case where said determination device judges that said image sensing apparatus is released from the first mode, said determination device causes said cover driving device to close said protection cover.

46. A camera comprising:
a protection cover for protecting a photographing optical system;
a cover driving device driving said protection cover; and
a determination device judging at least whether said camera is set in a first mode for being functionally connected with an external unit and whether said camera is set in a second mode for photographing without being functionally connected with the external unit, individually, said determination device also determining an operation of said cover driving device in accordance with a judgment result of said determination device.

47. A camera according to claim 46, wherein in a case where said determination device judges that said camera is set in the first mode, said determination device causes said cover driving device to open said protection cover.

48. A camera according to claim 46, wherein said determination device causes said cover driving device to open said protection cover, in a case where said determination device judges that said camera is set in the first mode, in response to a reception of a signal related to photographing start from the external unit.

49. A camera according to claim 48, wherein said determination device causes said cover driving device to close said protection cover in response to a completion of a photographing operation of said camera.

50. A camera according to claim 48, wherein said determination device comprises a timer for causing said cover driving device to close said protection cover a predetermined time period after a completion of a photographing operation of said camera.

51. A camera according to claim 50, wherein in a case where the signal related to photographing start is received again from the external unit during the predetermined time period, said determination device prevents said cover driving device from closing said protection cover after the predetermined time period elapses.

52. A camera according to claim 46, wherein said determination device prevents said cover driving device from opening said protection cover in a case where said determination device judges that said camera is set in the first mode.

53. A camera according to claim 46, wherein in a case where said determination device judges that said camera is set in the first mode, said determination device causes said cover driving device to close said protection cover in response to a completion of a photographing operation of said camera.

54. A camera according to claim 46, wherein said determination device comprises a timer for causing said cover driving device to close said protection cover a predetermined time period after a completion of a photographing operation of said camera, in a case where said determination device judges that said camera is set in the first mode.

55. A camera according to claim 54, wherein in a case where the signal related to photographing start is received again from the external unit during the predetermined time period, said determination device prevents said cover driving device from closing said protection cover after the predetermined time period elapses.

56. A camera according to claim 46, wherein in a case where said determination device judges that said camera is set in a third mode for reproduction, said determination device prevents said cover driving device from opening said protection cover.

57. A camera according to claim 46, further comprising:
an operation device for selectively setting said apparatus into at least the first and second modes, said operation device being provided at a position where a user can operate said operation device.

58. A camera according to claim 46, further comprising:
a signal processing device converting an optical image formed by the optical system into an electrical signal for display in a case where said camera is set in the second mode.

59. A camera according to claim 46, wherein said determination device judges a mode controlled by an external computer as the first mode.

60. A camera according to claim 46, wherein in a case where said determination device judges that said camera is released from the frist mode, said determinaton device causes said cover driving device to close said protection cover.

61. An image sensing apparatus comprising:
a protection cover for protecting an image sensing optical system;
a cover driving device driving said protection cover; and
a determination device judging at least whether said image sensing apparatus receives a signal related to image sensing from the external unit and whether said image sensing apparatus is set in an image sensing mode for image sensing without receiving the signal related to image sensing from the external unit, individually, said determination device also determining an operation of said cover driving device in accordance with a judgment result of said determination device.

62. An image sensing apparatus according to claim 61, wherein said determination device causes said cover driving device to open said protection cover, in a case where said determination device judges that said image sensing apparatus receives the signal related to image sensing from the external unit.

63. An image sensing apparatus according to claim 62, wherein said determination device causes said cover driving device to close said protection cover in response to a completion of an image sensing operation of said image sensing apparatus.

64. An image sensing apparatus according to claim 62, wherein said determination device comprises a timer for causing said cover driving device to close said protection cover a predetermined time period after a completion of an image sensing operation of said image sensing apparatus.

65. An image sensing apparatus according to claim 64, wherein in a case where said determination device judges that said image sensing apparatus receives the signal related to image sensing from the external unit again during the predetermined time period, said determination device prevents said cover driving device from closing said protection cover after the predetermined time period elapses.

66. An image sensing apparatus according to claim 61, wherein in a case where said determination device judges that said image sensing apparatus is set in a reproduction mode, said determination device prevents said cover driving device from opening said protection cover.

67. An image sensing apparatus according to claim 61, further comprising:
a signal processing device converting an optical image formed by the optical system into an electrical signal for display in a case where said image sensing apparatus is set in the image sensing mode.

68. An image sensing apparatus according to claim 61, wherein said determination device judges said image sensing apparatus receives the signal related to image sensing from an external computer.

69. A camera comprising:
a protection cover for protecting a photographing optical system;
a cover driving device driving said protection cover; and
a determination device judging at least whether said camera receives a signal related to photographing from the external unit and whether said camera is set in a photographing mode for photographing without receiving the signal related to photographing from the external unit, individually, said determination device also determining an operation of said cover driving device in accordance with a judgment result of said determination device.

70. A camera according to claim 69, wherein said determination device causes said cover driving device to open said protection cover, in a case where said determination device judges that said camera receives the signal related to photographing from the external unit.

71. A camera according to claim 70, wherein said determination device causes said cover driving device to close said protection cover in response to a completion of a photographing operation of said camera.

72. A camera according to claim 70, wherein said determination device comprises a timer for causing said cover driving device to close said protection cover a predetermined time period after a completion of a photographing operation of said camera.

73. A camera according to claim 72, wherein in a case where said determination device judges that said camera receives the signal related to photographing from the external unit again during the predetermined time period, said determination device prevents said cover driving device from closing said protection cover after the predetermined time period elapses.

74. A camera according to claim 69, wherein in a case where said determination device judges that said camera is set in a reproduction mode, said determination device prevents said cover driving device from opening said protection cover.

75. A camera according to claim 69, further comprising:
a signal processing device converting an optical image formed by the optical system into an electrical signal for display in a case where said camera is set in the photographing mode.

76. A camera according to claim 69, wherein said determination device judges said camera receives the signal related to photographing from an external computer.

77. A controlling method adapted to an image sensing apparatus having a cover driving device driving a protection cover for protecting an image sensing optical system, said method comprising the steps of:
judging at least whether said image sensing apparatus is in a first state of being functionally connected with an external unit and whether said image sensing apparatus is in a second state for image sensing without being functionally connected with the external unit, individually; and
determining an operation of said cover driving device in accordance with a judgment result of said judging step.

78. A controlling method adapted to a camera having a cover driving device driving a protection cover for protecting a photographing optical system, said method comprising the steps of:
judging at least whether said camera is in a first state of being functionally connected with an external unit and whether said camera is in a second state for photographing without being functionally connected with the external unit, individually; and determining an operation of said cover driving device in accordance with a judgment result of said judging step.

79. A controlling method adapted to an image sensing apparatus having a cover driving device driving a protection cover for protecting an image sensing optical system, said method comprising the steps of:

judging at least whether said image sensing apparatus is set in a first mode for being functionally connected with an external unit and whether said image sensing apparatus is set in a second mode for image sensing without being functionally connected with the external unit, individually; and determining an operation of said cover driving device in accordance with a judgment result of said judging step.

80. A controlling method adapted to a camera having a cover driving device driving a protection cover for protecting a photographing optical system, said method comprising the steps of:

judging at least whether said camera is set in a first mode for being functionally connected with an external unit and whether said camera is set in a second mode for photographing without being functionally connected with the external unit, individually; and determining an operation of said cover driving device in accordance with a judgment result of said judging step.

81. A controlling method adapted to an image sensing apparatus having a cover driving device driving a protection cover for protecting an image sensing optical system, said method comprising the steps of:

judging at least whether said camera receives a signal related to image sensing from the external unit and whether said image sensing apparatus is set in an image sensing mode for image sensing without receiving the signal related to image sensing from the external unit, individually; and determining an operation of said cover driving device in accordance with a judgment result of said judging step.

82. A controlling method adapted to a camera having a cover driving device driving a protection cover for protecting a photographing optical system, said method comprising the steps of:

judging at least whether said camera receives a signal related to photographing from the external unit and whether said camera is set in a photographing mode for photographing without receiving the signal related to photographing from the external unit, individually; and determining an operation of said cover driving device in accordance with a judgment result of said judging step.

* * * * *